Patented June 17, 1952

2,601,066

UNITED STATES PATENT OFFICE 2,601,066

PREPARATION OF ALKALI METAL SALTS FROM ALKALI METAL CHLORIDES

Maurice Sourdet and Jean Martin, Paris, France, assignors to Societe d'Etudes Chimiques Pour l'Industrie et l'Agriculture, Paris, France, a French company No Drawing. Application December 7, 1950, Serial No. 199,724. In France December 8, 1949

10 Claims. (Cl. 23—63)

The methods at present known for preparing alkali salts from alkali chlorides involve either an electrolysis, or a chemical reaction. In the chemical type of preparation, it has already been proposed to bring into action an intermediate compound capable of fixing the alkali metal of the chloride, yielding a compound adapted subsequently to release the alkali metal by reaction with an acid. The intermediate compound generally used is one possessing a weak acidic function under the conditions of the reaction. Thus $SiO_2$ has been advocated for the purpose. The use of silica however, while theoretically suitable, displays grave drawbacks in its practical application; the conversion reaction of the alkali chloride into alkali silicate is incomplete, and moreover the formation of colloidal precipitates difficult to filter off quite precludes the industrial practice of the process.

The method of this invention essentially consists of treating an alkali metal chloride by an unsaturated calcium phosphate, so as to form a calico-alkaline double phosphate; this salt is then decomposed by the acid of the salt it is desired to obtain.

The method of preparing an alkali metal salt according to the invention therefore comprises two stages. In a first stage, the alkali chloride is reacted with non-saturated calcium phosphate, i. e. one having a weak acidic function at the reaction temperature, in the presence of water vapor or a gas containing water vapor, e. g. combustion gases from an industrial furnace. The reaction temperature may be varied over quite a wide range; best results are obtained with temperatures from 700° C. to 900° C. The reaction products are, on the one hand hydrochloric acid which may be recovered by dissolution in water or other suitable means, and on the other a calcio-alkaline double phosphate. In the second stage of the method, this double phosphate from the first stage, reduced to powder form, is placed in suspension in water, and treated by a weak acid, preferably in the gaseous state, e. g. $CO_2$, $SO_2$, or the like, at a pressure equal to or higher than atmospheric and at a temperature equal to or higher than the surrounding temperature. Thus, the alkali salt of the weak acid is obtained on the one hand and on the other the phosphate of lime used in the first stage of the process is regenerated, and may be re-used to treat a new charge of alkali chloride.

The following example will illustrate the invention, but is by no means restrictive.

*Example.*—One starts from a mixture composed of 100 parts of dry KCl and 180 parts of monohydric calcium phosphate dihydrate $HCaPO_4, 2H_2O$ (or the corresponding amount of the anhydrous salt or of pyrophosphate).

These starting materials are finely ground and then intimately mixed. They are heated in the presence of a jet of steam at a temperature increasing to red heat. The excess KCl is volatilized. At the end of the operation there is obtained a solid product free of chloride and essentially consisting of calcium-potassium phosphate $KCaPO_4$.

The yield of the operation is practically quantitative, on the basis of the $P_2O_5$ used, so that at the end of the operation, with due allowance for the quantities of starting materials, there are obtained 185 parts of potassium-calcium phosphate.

These 185 parts of potassium-calcium phosphate are placed in suspension in 375 parts water. Carbon dioxide is then made to act under a reaction pressure of 15 kg./sq. cm. and at the surrounding temperature. At the end of the operation, the solid phase is separated from the liquid phase. The liquid phase, after evaporation, yields a dry extract having the following composition by weight:

| | Parts |
|---|---|
| $HKCO_3$ | 97.6 |
| Potassium phosphate | 3.1 |
| Monohydric calcium phosphate | 0.6 |

After calcination of the dry extract, a product is obtained having the following composition:

| | Parts |
|---|---|
| $K_2CO_3$ | 67.5 |
| Potassium phosphate | 3.1 |
| Monohydric calcium phosphate | 0.6 |

The net yield is 95% $K_2CO_3$ on the basis of the unvolatilized KCl, the volatilized KCl being easily recoverable.

The solid phase which is separated from the liquid phase, as above described, has the following composition:

| | Parts |
|---|---|
| Calcium hydrophosphate | 170 |
| Calcium potassium phosphate | 6 |
| Calcium carbonate | 2 |

There are thus recovered practically the whole of the 180 parts of calcium hydrophosphate used as the initial reactant, and this recovered calcium hydrophosphate may conveniently be used to effectuate the conversion of a new charge of the alkali metal chloride into the alkali metal salt as above set forth.

What we claim is:

1. Method of preparing an alkali metal salt from an alkali metal chloride which comprises (1) admixing, in the dry state, alkali metal chloride and calcium hydrophosphate, (2) reacting said mixture in the presence of water in the vapor state at an elevated temperature to produce a solid product free of chloride and consisting essentially of calcium-alkali metal phosphate, (3) placing said double phosphate in aqueous suspension and introducing therein a weakly acidic gas thereby to regenerate the calcium hydrophosphate in the solid phase, (4) separating the liquid phase from said solid phase, and (5) evaporating the liquid phase to obtain the alkali metal salt of said weak acid.

2. Method in accordance with claim 1 wherein the elevated temperature of step (2) is from about 700° C. to 900° C.

3. Method in accordance with claim 1 wherein the alkali metal chloride is potassium chloride.

4. Method of preparing an alkali metal salt from an alkali metal chloride which comprises: (1) admixing, in the dry state, alkali metal chloride and calcium hydrophosphate, (2) reacting said mixture in the presence of water in the vapor state at an elevated temperature to produce an alkali-calcium double phosphate, (3) placing said double phosphate in aqueous suspension and introducing therein carbon dioxide gas to produce the alkali metal carbonate and to regenerate the calcium hydrophosphate in the solid phase, (4) separating the liquid phase from the solid phase, and (5) recovering the alkali metal carbonate from the liquid phase.

5. Method in accordance with claim 4 wherein the elevated temperature of step (2) is from about 700° C. to 900° C.

6. Method in accordance with claim 4 wherein the alkali metal chloride is potassium chloride.

7. Method of preparing an alkali metal salt from an alkali metal chloride which comprises: (1) admixing, in the dry state, alkali metal chloride and calcium hydrophosphate, (2) reacting said mixture in the presence of water in the vapor state at an elevated temperature to produce alkali metal-calcium phosphate, (3) placing said double phosphate in aqueous suspension and introducing therein sulphur dioxide to produce a solution of alkali metal sulphite and to regenerate the calcium hydrophosphate in the solid state, (4) separating the liquid phase from the solid phase, and (5) recovering the alkali metal sulphite from the liquid phase.

8. Method in accordance with claim 7 wherein the elevated temperature of step (2) is from about 700° C. to 900° C.

9. Method in accordance with claim 7 wherein the alkali metal chloride is potassium chloride.

10. Method of preparing an alkali metal salt from an alkali metal chloride which comprises: (1) admixing, in the dry state, alkali metal chloride and calcium hydrophosphate, (2) reacting said mixture at an elevated temperature in the presence of furnace combustion gases containing water vapor to produce a solid product consisting essentially of calcium-alkali metal phosphate, (3) placing said double phosphate in aqueous suspension and introducing therein a weakly acidic gas thereby to regenerate the calcium hydrophosphate in the solid state, (4) separating the liquid phase from the solid phase, and (5) evaporating the liquid phase to obtain the alkali metal salt of said weak acid.

MAURICE SOURDET.
JEAN MARTIN.

REFERENCES CITED

The following references are of record in the file of this patent:

UNITED STATES PATENTS

| Number | Name | Date |
|---|---|---|
| 1,191,615 | Ross et al. | July 18, 1916 |
| 1,351,672 | Meigs | Aug. 31, 1920 |
| 1,351,693 | Sadtler | Aug. 31, 1920 |
| 1,357,120 | Sadtler | Oct. 26, 1920 |
| 1,504,340 | Glaeser | Aug. 12, 1924 |
| 1,699,234 | Gaus et al. | Jan. 15, 1929 |

FOREIGN PATENTS

| Number | Country | Date |
|---|---|---|
| 184,206 | Great Britain | Aug. 17, 1922 |

OTHER REFERENCES

J. W. Mellor's "Inorganic and Theoretical Chemistry," vol. 3, (1923 ed.) pages 878, 880, 882, 885, Longmans, Green & Co., N. Y., publishers.